(12) United States Patent
Zhang (10) Patent No.: US 10,164,771 B2
(45) Date of Patent: Dec. 25, 2018

(54) ENCRYPTION METHOD AND ENCRYPTION DEVICE

(71) Applicant: SHENZHEN GOODIX TECHNOLOGY CO., LTD., Shenzhen, Guangdong (CN)

(72) Inventor: Ming Zhang, Guangdong (CN)

(73) Assignee: SHENZHEN GOODIX TECHNOLOGY CO., LTD., Shenzhen, Guangdong (CN)

( * ) Notice: Subject to any disclaimer, the term of this patent is extended or adjusted under 35 U.S.C. 154(b) by 144 days.

(21) Appl. No.: 15/249,913

(22) Filed: Aug. 29, 2016

(65) Prior Publication Data

US 2016/0373249 A1 Dec. 22, 2016

Related U.S. Application Data

(63) Continuation of application No. PCT/CN2014/094727, filed on Dec. 23, 2014.

(30) Foreign Application Priority Data

Sep. 23, 2014 (CN) .................. 2014 1 04900860

(51) Int. Cl.
*H04L 9/06* (2006.01)
*H04L 9/08* (2006.01)

(52) U.S. Cl.
CPC .......... *H04L 9/0631* (2013.01); *H04L 9/0861* (2013.01); *H04L 2209/24* (2013.01)

(58) Field of Classification Search
CPC .................. H04L 9/0631; H04L 2209/24

(Continued)

(56) References Cited

U.S. PATENT DOCUMENTS

2006/0002549 A1 1/2006 Avasarala et al.
2006/0147040 A1* 7/2006 Lee ..................... H04L 9/0631
380/28

(Continued)

FOREIGN PATENT DOCUMENTS

CN 1663172 A 8/2005
CN 1677921 A 10/2005

(Continued)

OTHER PUBLICATIONS

State Intellectual Property Office of the P.R. China (ISR/CN), "International Search Report for PCT/CN2014/094727", China, dated Jun. 30, 2015.

(Continued)

*Primary Examiner* — Teshome Hailu
(74) *Attorney, Agent, or Firm* — Locke Lord LLP; Tim Tingkang Xia, Esq.

(57) ABSTRACT

The present disclosure discloses an encryption method and an encryption apparatus. The encryption method comprises: generating an AES initial key by using an SAES encryption algorithm, and expanding the AES initial key to obtain an AES encryption key; and encrypting information to be encrypted by using the AES encryption key according to an AES encryption algorithm to generate encrypted data. As such, the AES encryption key is encrypted by introducing the SAES algorithm, which increases the difficulty in cracking the AES encryption key. An attacker may crack the AES by firstly cracking the AES encryption key, which increases the overall difficulty in cracking the AES encrypted data. Further, the SAES encryption algorithm and the AES encryption algorithm are implemented by means of an ASIC integrated in an encryption chip.

8 Claims, 7 Drawing Sheets

(58) Field of Classification Search
USPC .......................................................... 380/44
See application file for complete search history.

(56) References Cited

U.S. PATENT DOCUMENTS

| | | | |
|---|---|---|---|
| 2009/0106551 A1 | 4/2009 | Boren et al. | |
| 2010/0008498 A1* | 1/2010 | Shirai | H04L 9/002 380/44 |
| 2010/0042835 A1* | 2/2010 | Lee | G06F 21/31 713/168 |
| 2010/0115286 A1 | 5/2010 | Hawkes et al. | |
| 2010/0150350 A1 | 6/2010 | Reidenbach | |
| 2010/0293380 A1* | 11/2010 | Wiseman | H04L 9/0855 713/169 |

FOREIGN PATENT DOCUMENTS

| | | |
|---|---|---|
| CN | 101512619 A | 8/2009 |
| CN | 101782956 A | 7/2010 |
| CN | 101827107 A | 9/2010 |
| CN | 102025484 A | 4/2011 |
| CN | 102045169 A | 5/2011 |
| CN | 103209071 A | 7/2013 |
| CN | 103488917 A | 1/2014 |
| CN | 103516512 A | 1/2014 |
| WO | 2006063275 A1 | 6/2006 |

OTHER PUBLICATIONS

State Intellectual Property Office of the P. R. C., "First Chinese Office Action for Application No. 201410490086.0", China, dated Jan. 5, 2017.
Mansoori et al., On the vulnerability of Simplified AES Algorithm Against Linear Cryptanalysis, IJCSNS International Journal of computer Science and Network Security, vol. 7, No. 7, Jul. 2007, Tehran, Iran.
Korean Intellectual Property Office, "1st Office Action for KR10-2016-7021768", Korea, dated Nov. 15, 2017.
State Intellectual Property Office of the P.R. China, "2nd Office Action for CN201410490086.0", China, dated Jun. 13, 2017.
European Patent Office, "Extended European Search Report for EP Application No. 14902550.4", Munich, dated Mar. 28, 2018.
Daemen J et al., "AES Proposal: Rijndael", The Rijndael Block Cipher, AES Proposal, Sep. 3, 1999, pp. 1-45, XP001060386.

* cited by examiner

ENCRYPTION METHOD AND ENCRYPTION DEVICE

CROSS-REFERENCE TO RELATED APPLICATIONS

This application is a continuation of International Patent Application No. PCT/CN2014/094727, with an international filing date of Dec. 23, 2014, designating the United States, now pending, which is based on Chinese Patent Application No. 201410490086.0, filed Sep. 23, 2014. The contents of these specifications are incorporated herein by reference.

BACKGROUND OF THE INVENTION

Field of the Invention

The present disclosure relates to the technical field of communications, and in particular, relates to an encryption method and an encryption apparatus.

Description of the Related Art

Modern cryptology generally employs an encryption method of changing original information by using some mathematical calculation operations. With such method, information is disguised to conceal the content thereof by using a specific method, which is referred to as information encryption. The information to be encrypted is referred to a plaintext. The encrypted information is referred to as a ciphertext. The process of converting a ciphertext to a plaintext is referred to as decryption. Encryption and decryption use one category of algorithm. Different operations of these algorithms may be represented by different parameters, and these parameters are referred to as keys. According to the characteristics of the keys, ciphers may be categorized into symmetric key ciphers and public key ciphers. The symmetric key cipher is also referred to as a private key cipher or a single key cipher, wherein the encryption key and the decryption key are the same, or either of them may be easily derived from the other. The public key cipher is referred to as an asymmetric key cipher or a double-key cipher. In the public key cipher, the encryption key and the decryption key are different, or either of them is hard to be derived from the other. According to different encryption manners, the symmetric key ciphers may be categorized into block ciphers and stream ciphers. The block cipher partitions a plaintext into blocks according to a specific bit length, and a ciphertext having a fixed length is output. The block cipher is advantageous in that the key may be fixed within a specific time period, with no need of being changed each time, which therefore gives convenience to key assignment.

Data Encryption Standard (DES) ciphers are the first block ciphers, which were released by the National Institute of Standards and Technology (NIST) in 1977. However, with advancement of symmetric ciphers, the DES data encryption standard algorithm does not accommodate any more the requirements imposed by the current distributed open networks to data encryption security. Accordingly, in 1997, NIST released a new encryption algorithm named Advanced Encryption Standard (AES). The AES, as a new generation data encryption standard, aggregates such advantages as strong security, high performance, high efficiency, ease of use, flexibility and the like.

However, since an AES encryption key may be simply cracked, and once the AES encryption key is cracked, the AES may be cracked, and thus the current AES encryption fails to ensure data security.

SUMMARY OF THE INVENTION

The present disclosure provides an encryption method and an encryption apparatus, to increase the difficulty of cracking AES and improve data security.

To this end, the present disclosure provides an encryption method, including:

generating an AES initial key by using an SAES encryption algorithm, and obtaining an AES encryption key by expanding the AES initial key; and encrypting information to be encrypted by using the AES encryption key according to an AES encryption algorithm to generate encrypted data.

The attainment of the objectives, functional features and advantages of the present disclosure are further described hereinafter with reference to the specific embodiments and the accompanying drawings.

DETAILED DESCRIPTION OF THE EMBODIMENTS

It should be understood that the embodiments described herein are only exemplary ones for illustrating the present disclosure, and are not intended to limit the present disclosure.

Figure 1:
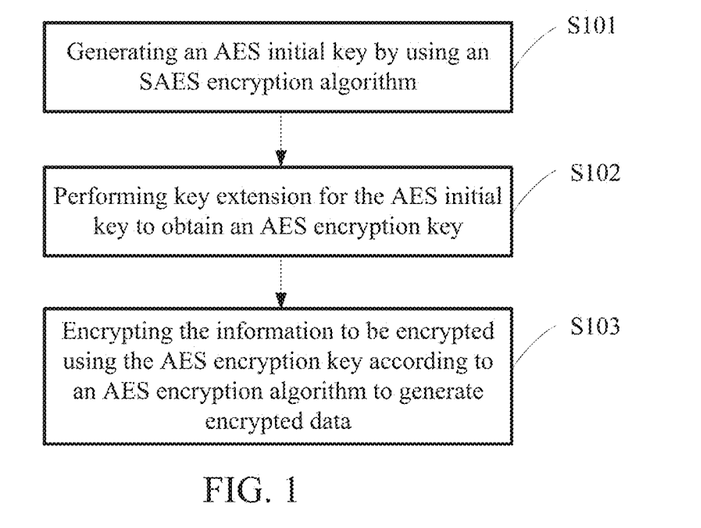
FIG. 1 is a flowchart of an encryption method according to an embodiment of the present disclosure.

Referring to FIG. 1, an embodiment of the present disclosure provides an encryption method, wherein the encryption method includes the following steps:

Step S101: generating an AES initial key by using an SAES encryption algorithm.

The simplified-AES (SAES) encryption algorithm may be implemented by means of software, or may be implemented by means of hardware of an encryption chip. For example, the SAES encryption algorithm may be implemented by means of a field-programmable gate array (FPGA) integrated in the encryption chip, preferably implemented by means of an application specific integrated circuit (ASIC) integrated in the encryption chip. Since the ASIC is a customized circuit and no code or program can be intercepted, the risk that the SAES is cracked due to interception of the program or code may be prevented.

Figure 2:
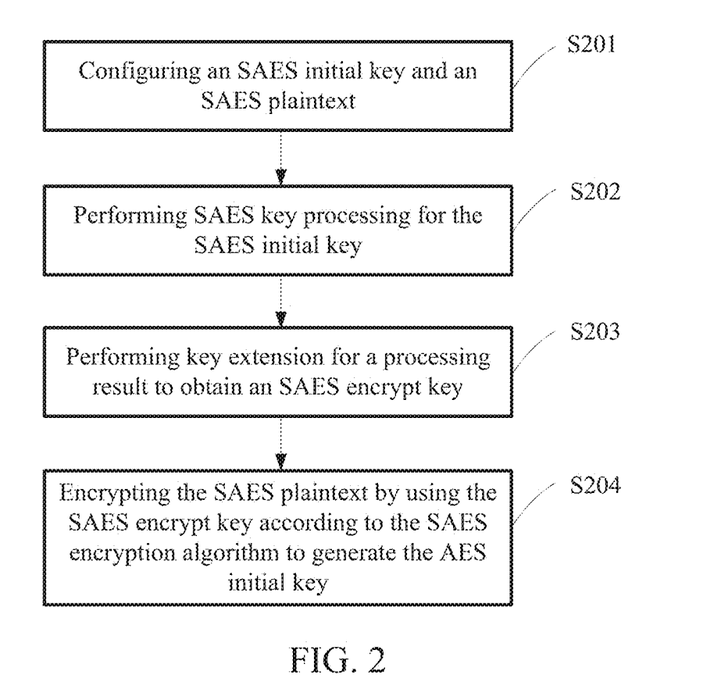
FIG. 2 is a flowchart of generating an AES initial key in an encryption manner according to an embodiment of the present disclosure.
Figure 3:
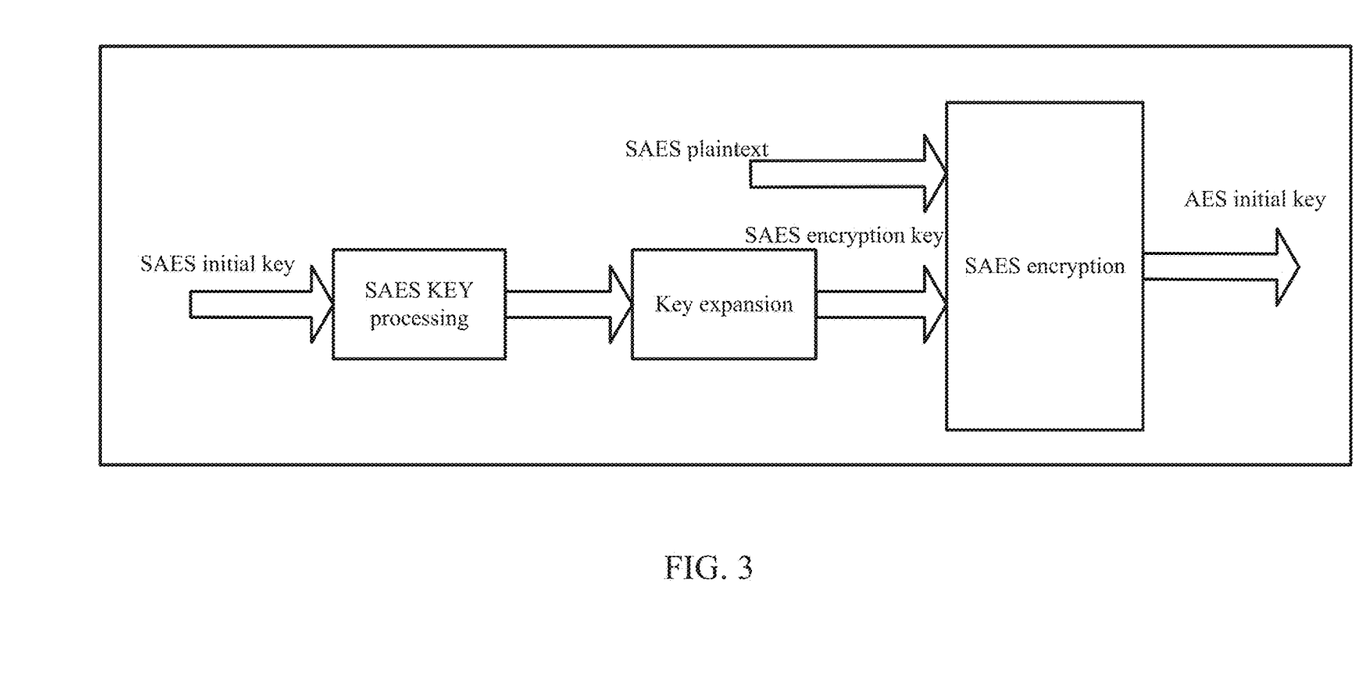
FIG. 3 is a schematic diagram of generating the AES initial key in an encryption manner according to an embodiment of the present disclosure.

The process of generating the AES initial key in an encryption manner is specifically as illustrated in FIG. 2 and FIG. 3, which includes the following steps:

Step S110: configuring an SAES initial key and an SAES plaintext.

The SAES initial key and the SAES plaintext are generally configured to a random number, wherein the SAES initial key is M groups of N-bit data, and N is generally less than or equal to 256 bits.

Step S120: performing an SAES key processing for the SAES initial key.

Figure 4:
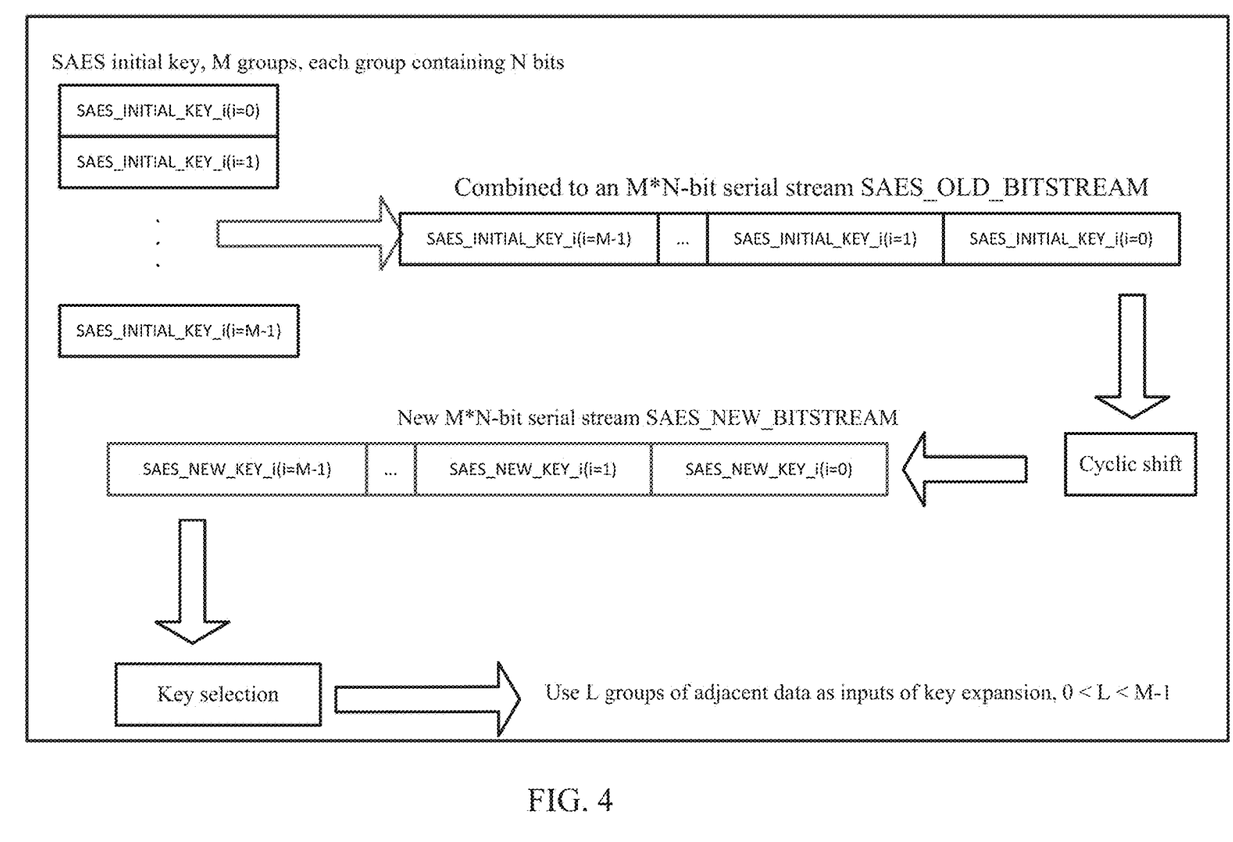
FIG. 4 is a schematic diagram of performing an SAES KEY processing according to an embodiment of the present disclosure.

The SAES key processing mainly includes performing a cyclic shift step for data in the SAES initial key and performing a key selection step for the data after being performed the cyclic shift step. The specific process is as illustrated in FIG. 4.

Firstly, the M groups of N-bit data in the SAES initial key is combined together to an M*N-bit serial stream, SAES_OLD_BITSTREAM.

Then a cyclic shift step is performed for the serial stream SAES_OLD_BITSTREAM. A left cyclic shift or a right cyclic shift may be performed, and a new M*N-bit serial stream SAES_NEW_BITSTREAM is generated. For example, a left cyclic shift by N bits is performed, and the least significant N bits of the SAES_NEW_BITSTREAM are obtained upon shift of the most significant N bits of the SAES_OLD_BITSTREAM, and the other (M−1)*N bits of the SAES_OLD_BITSTREAM are all shifted leftwards by N bits.

Finally, a key selection step is performed for the new serial stream SAES_NEW_BITSTREAM; L groups of adjacent data are selected therefrom by configuring parameters, that is, L groups of adjacent SAES_NEW_KEYS are selected from M SAES_NEW_KEYS as outputs, wherein 0<L<M+1 (when L is a minimum value 1, it indicates that any N bits are selected from the M SAES_NEW_KEYS; and when L is a maximum value M, it indicates that all the bits are selected). For example, SAES_NEW_KEY_i (i=1,2,3) may be selected as outputs, that is, 3*N-bit data is output as inputs of the subsequent SAES encryption key expansion.

Step S130: performing a key expansion for the processing result to acquire SAES encryption key.

The processing result is the L groups of adjacent data selected upon the key selection step. Upon the key expansion, the SAES encryption key is generated, whose length is a product of the number of SAES iterations and the length of the SAES plaintext to be encrypted. The key expansion may employ a standard key expansion manner in the related art, which is thus not described herein any further.

Step S140: encrypting the SAES plaintext by using the SAES encryption key according to the SAES encryption algorithm to generate the AES initial key. Herein the SAES plaintext may be randomly 128 bits, 192 bits or 256 bits. Upon the SAES encryption, a 128-bit, 192-bit or 256-bit ciphertext is output, that is, the AES initial key.

Figure 5:
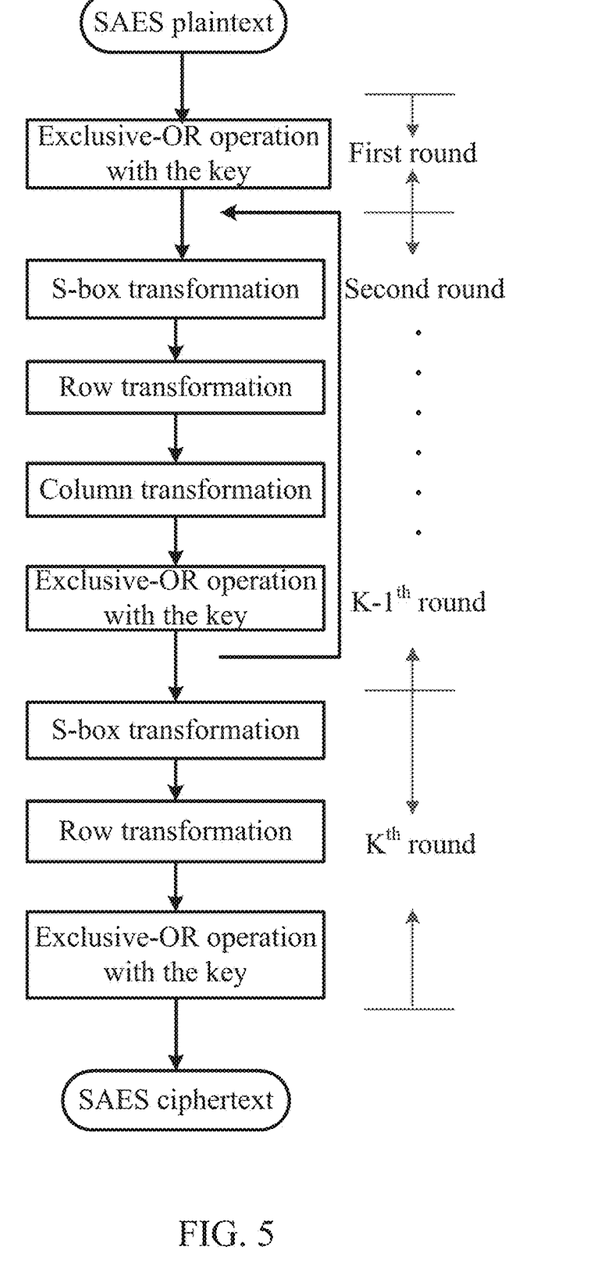
FIG. 5 is a schematic diagram of an SAES algorithm according to an embodiment of the present disclosure.

The SAES encryption algorithm is specifically as illustrated in FIG. 5. The number of SAES iterations is K. In the first round of iteration, an exclusive-OR operation is carried out between the SAES plaintext and the key of the first round; the intermediate K−2 rounds of iterations are sequentially subjected to S-box transformation, row transformation, column transformation, and an exclusive-OR operation with each round of keys; the last round of iterations (the $K^{th}$ round) is not subjected to the column transformation as compared with the intermediate K−2 rounds of iterations; and a resulting SAES ciphertext is the AES initial key, that is, the AES initial key is a key subjected to the SAES encryption processing.

After the AES initial key is generated, the process enters step S102.

Step S102: performing key expansion for the AES initial key to obtain an AES encryption key.

The AES initial key generally has a length of 128 bits, 192 bits or 256 bits, and the AES encryption key generated upon the key expansion has a length of a product of the number of AES iterations and the length of the information to be encrypted. The key expansion employs a standard key expansion manner in the related art, which is thus not described herein any further.

Step S103: encrypting the information to be encrypted by using the AES encryption key according to an AES encryption algorithm to generate encrypted data.

The information to be encrypted may be data information stored by a user, or may be biological characteristic information of the user, wherein the biological characteristic information may be fingerprint information, iris information, face information, vein information, earprint information or the like. The AES encryption algorithm may be implemented by means of software or may be implemented by means of hardware of an encryption chip. For example, the SAES encryption algorithm may be implemented by means of an FPGA integrated in the encryption chip, preferably implemented by means of an ASIC integrated in the encryption chip. Since the ASIC is a customized circuit and no code or program can be intercepted, the risk that the AES is cracked due to interception of the program or code is prevented.

Figure 6:
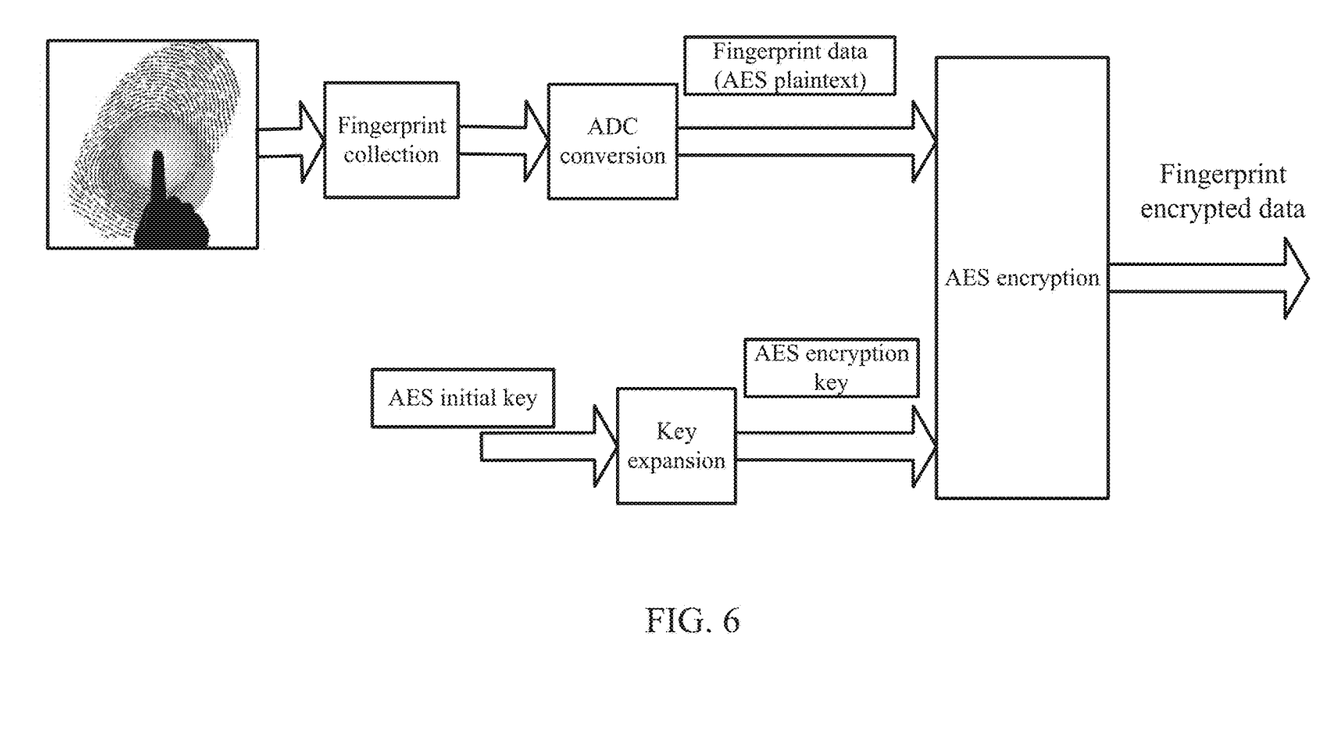
FIG. 6 is a schematic diagram of performing AES encryption for fingerprint information according to an embodiment of the present disclosure.

As illustrated in FIG. 6, using encryption of fingerprint information as an example, while the AES encryption key is obtained by means of key expansion, a terminal collects fingerprint information by using a fingerprint collection sensor, and converts the fingerprint information from an analog signal to a digital signal by using an analog-to-digital converter (ADC). In this case, the fingerprint data in the form of the digital signal is the AES plaintext. Finally, the fingerprint digital signal is encrypted by using the AES encryption key according to an AES encryption algorithm to generate encrypted fingerprint data.

Figure 7:
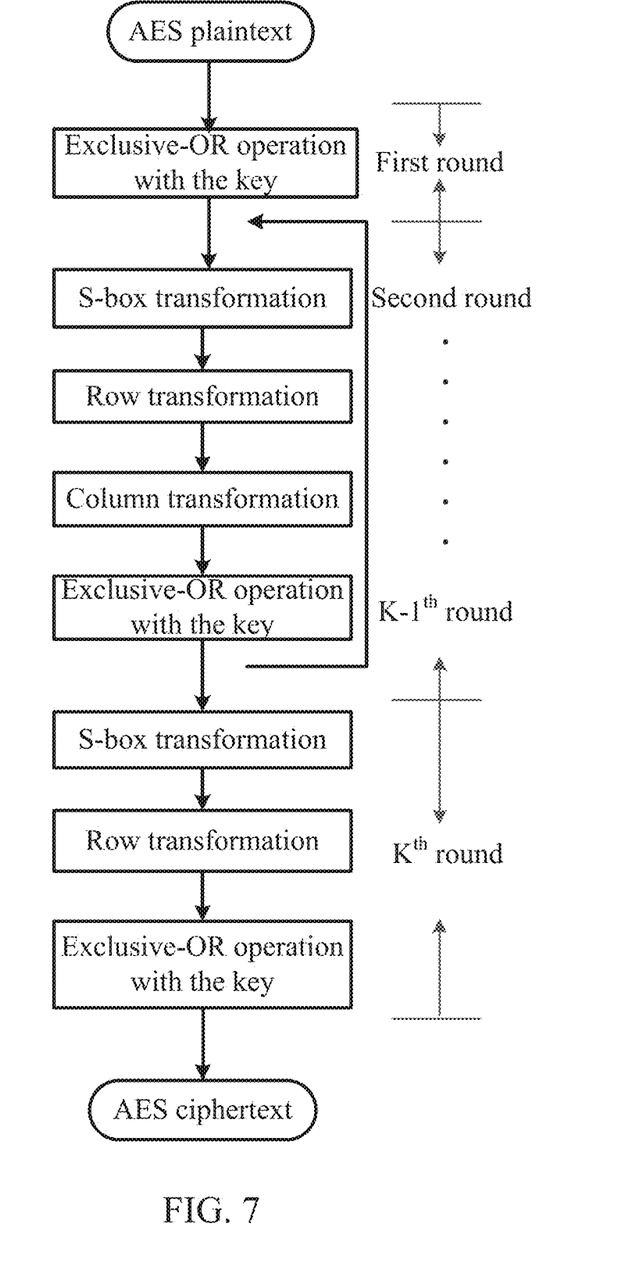
FIG. 7 is a schematic diagram of an AES algorithm according to an embodiment of the present disclosure.

The AES encryption algorithm is specifically as illustrated in FIG. 7. As illustrated in FIG. 7, the AES plaintext is the information to be encrypted, and the number of AES iterations is K. In the first round of iteration, an exclusive-OR operation is carried out between the AES plaintext and the key of the first round; the intermediate K−2 rounds of iterations are sequentially subjected to S-box transformation, row transformation, column transformation, and an exclusive-OR operation with each round of keys; the last round of iterations (the $K^{th}$ round) is not subjected to the column transformation as compared with the intermediate K−2 rounds of iterations; and a finally generated AES ciphertext is the encrypted data. The AES encryption algorithm and the SAES encryption algorithm have the same algorithm theory, and the only difference between these two algorithms lies in the number of iterations K. Generally, the number of AES iterations is greater than the number of SAES iterations.

With the encryption method according to the present disclosure, an AES initial key is generated by using the SAES encryption algorithm, the generated AES initial key is expanded to an AES encryption key, and information to be encrypted is encrypted by using an encrypted AES encryption key. As such, the AES encryption key is encrypted by using the SAES algorithm, which increases the difficulty in cracking the AES encryption key. An attacker may crack the AES by firstly cracking the AES encryption key, which increases the overall difficulty in cracking the AES encrypted data.

Further, the SAES encryption algorithm and the AES encryption algorithm are implemented by means of an ASIC integrated in an encryption chip. Since the ASIC is a customized circuit and no code or program can be intercepted, the risk that the SAES and the AES are cracked due to interception of the program or code is prevented. Finally, data security is improved.

Figure 8:
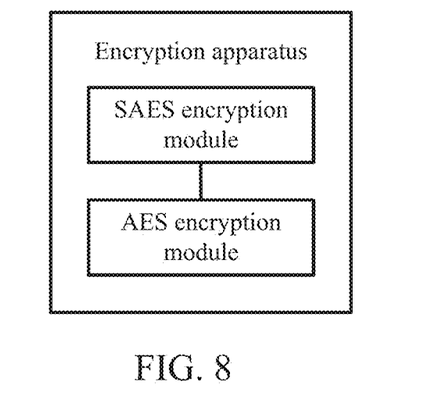
FIG. 8 is a schematic diagram of modules of an encryption apparatus according to an embodiment of the present disclosure.
Figure 9:
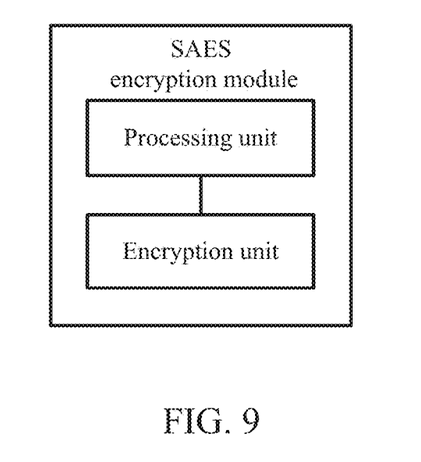
FIG. 9 is a schematic diagram of modules of an SAES encryption module in FIG. 8.

Referring to FIG. 8 and FIG. 9, an embodiment of the present disclosure provides an encryption apparatus. The encryption apparatus includes an SAES encryption module and an AES encryption module.

The SAES encryption module is configured to generate an AES initial key by using an SAES encryption algorithm, and send the AES initial key to the AES encryption module.

The SAES encryption algorithm may be implemented by means of software or may be implemented by means of hardware of an encryption chip. For example, the SAES encryption algorithm may be implemented by means of an FPGA or an ASIC integrated in an encryption chip. That is, the SAES encryption module is an FPGA or an ASIC integrated in an encryption chip, preferably, an ASIC. Since the ASIC is a customized circuit and no code or program can be intercepted, the risk that the SAES is cracked due to interception of the program or code is prevented.

As illustrated in FIG. 9, the SAES encryption module includes a processing unit and an encryption unit.

The processing unit is configured to configure an SAES initial key and an SAES plaintext, perform SAES key processing for the SAES initial key, and perform key expansion for the processing result to obtain an SAES encryption key.

The processing unit generally configures a random number as the SAES initial key and the SAES plaintext, wherein the SAES initial key is M groups of N-bit data, and N is generally less than or equal to 256 bits.

The processing unit performs the SAES key processing, which mainly includes performing a cyclic row shift step for data in the SAES initial key and performing a key selection step for the data after being performed the cyclic row shift step. The specific process is as illustrated in FIG. 4.

Firstly, the processing unit combines the M groups of N-bit data of the SAES initial key to an M*N-bit serial stream SAES_OLD_BITSTREAM. Then, the processing unit performs a cyclic shift step for the serial stream SAES_OLD_BITSTREAM. A left cyclic shift or a right cyclic shift may be performed, and a new M*N-bit serial stream SAES_NEW_BITSTREAM is generated. For example, a left cyclic shift by N bits is performed, and the least significant N bits of the SAES_NEW_BITSTREAM are obtained upon shift of the most significant N bits of the SAES_OLD_BITSTREAM, and the other (M−1)*N bits of the SAES_OLD_BITSTREAM are all shifted leftwards by N bits.

Finally, the processing unit performs a key selection step for the new serial stream SAES_NEW_BITSTREAM; L groups of adjacent data are selected there from by configuring parameters, that is, L groups of adjacent SAES_NEW_KEYS are selected from M SAES_NEW_KEYS as outputs, wherein 0<L<M+1 (when L is a minimum value 1, it indicates that any N bits are selected from the M SAES_NEW_KEYS; and when L is a maximum value M, it indicates that all the bits are selected). For example, SAES_NEW_KEY_i (i=1,2,3) may be selected as outputs, that is, 3*N-bit data is output as inputs of the subsequent SAES encryption key expansion.

Upon performing key expansion for the processing result, the processing unit generates the SAES encryption key whose length is a product of the number of SAES iterations and the length of the SAES plaintext (SAES DATA) to be encrypted. The key expansion employs a standard key expansion manner in the related art, which is thus not described herein any further.

The encryption unit is configured to encrypt the SAES plaintext by using the SAES encryption key according to the SAES encryption algorithm to generate the AES initial key. Herein the SAES plaintext may be randomly 128 bits, 192 bits or 256 bits. Upon the SAES encryption, a 128-bit, 192-bit or 256-bit plaintext is output, that is, the AES initial key.

The SAES encryption algorithm is specifically as illustrated in FIG. 5. The number of SAES iterations is K. In the first round of iteration, an exclusive-OR operation is carried out between the SAES plaintext and the key of the first round; the intermediate K−2 rounds of iterations are sequentially subjected to S-box transformation, row transformation, column transformation, and an exclusive-OR operation with each round of keys; the last round of iterations (the $K^{th}$ round) is not subjected to the column transformation as compared with the intermediate K−2 rounds of iterations; and a finally generated SAES ciphertext is the AES initial key, that is, the AES initial key is a key subjected to the SAES encryption processing.

The AES encryption module is configured to expand the AES initial key to obtain an AES encryption key, and encrypt information to be encrypted by using the AES encryption key according to an AES encryption algorithm to generate encrypted data.

The information to be encrypted may be data information stored by a user, or may be biological characteristic information of the user, wherein the biological characteristic information may be fingerprint information, iris information, face information, vein information, earprint information or the like. The AES encryption algorithm may be implemented by means of software or may be implemented by means of hardware of an encryption chip. For example, the SAES encryption algorithm may be implemented by means of an FPGA or an ASIC integrated in an encryption chip. That is, the AES encryption module is an FPGA or an ASIC integrated in an encryption chip, preferably, an ASIC. Since the ASIC is a customized circuit and no code or program can be intercepted, the risk that the SAES is cracked due to interception of the program or code is prevented.

The AES encryption algorithm is specifically as illustrated in FIG. 7. The number of AES iterations is K. In the first round of iteration, an exclusive-OR operation is carried out between the AES plaintext and the first key of the first round; the intermediate K-2 rounds of iterations are sequentially subjected to S-box transformation, row transformation, column transformation, and an exclusive-OR operation with each round of keys; the last round of iterations (the $K^{th}$ round) is not subjected to the column transformation as compared with the intermediate K-2 rounds of iterations; and a finally generated AES ciphertext is the encrypted data. The AES encryption algorithm and the SAES encryption algorithm have the same algorithm theory, and the only difference between these two algorithms lies in the number of iterations K. Generally, the number of AES iterations is greater than the number of SAES iterations.

With the encryption apparatus according to the present disclosure, an SAES encryption module generates an AES initial key, an AES encryption module expands the generated AES initial key to an AES encryption key, and information to be encrypted is encrypted by using an encrypted AES encryption key. As such, the AES encryption key is encrypted by introducing the SAES algorithm, which increases the difficulty in cracking the AES encryption key. An attacker may crack the AES by firstly cracking the AES encryption key, which increases the overall difficulty in cracking the AES encrypted data.

Further, the SAES encryption algorithm integrated in the ASIC of the encryption chip is used as the SAES encryption algorithm and the AES encryption module. Since the ASIC is a customized circuit and no code or program can be intercepted, the risk that the SAES and the AES are cracked due to interception of the program or code is prevented. Finally, data security is improved.

It should be noted that when the encryption module according to the above embodiment practices the encryption, description is given only by using division of various functional modules as an example. In practice, the functions may be assigned to and implemented by different functional modules according to the actual needs. In addition, the encryption apparatus according to the above embodiment is based on the same inventive concept as the encryption method embodiments. The specific implementation thereof is elaborated in the method embodiments and the technical features in the method embodiments are correspondingly applicable to the apparatus embodiments, which is thus not described herein any further.

It is understandable to those skilled in the art that all or partial steps of the method described in the above embodiments can be implemented by controlling relevant hardware by programs. The programs may be stored in a computer readable storage medium. The storage medium may be a read only memory (ROM), random access memory (RAM), a magnetic disk or a compact disc read-only memory (CD-ROM).

It should be understood that described above are merely exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

INDUSTRIAL PRACTICABILITY

The present disclosure offers an encryption method and an encryption apparatus, generating an AES initial key by using an SAES encryption algorithm, and expanding the AES initial key to obtain an AES encryption key; and encrypting information to be encrypted by using the AES encryption key according to an AES encryption algorithm to generate encrypted data. As such, the AES encryption key is encrypted by introducing the SAES algorithm, which increases the difficulty in cracking the AES encryption key. An attacker may crack the AES by firstly cracking the AES encryption key, which increases the overall difficulty in cracking the AES encrypted data. Further, the SAES encryption algorithm and the AES encryption algorithm are implemented by means of an ASIC integrated in an encryption chip. Since the ASIC is a customized circuit and no code or program can be intercepted, the risk that the SAES and the AES are cracked due to interception of the program or code is prevented. Finally, data security is improved.

What is claimed is:

1. An encryption method, comprising:
generating an Advanced Encryption Standard (AES) initial key by using a Simplified Advanced Encryption Standard (SAES) encryption algorithm;
expanding the AES initial key to obtain an AES encryption key; and
encrypting information to be encrypted by using the AES encryption key according to an AES encryption algorithm;
wherein the generating the AES initial key by using the SAES encryption algorithm comprises:
configuring an SAES initial key and an SAES plaintext;
performing SAES key processing for the SAES initial key to obtain a processing result;
performing key expansion for the processing result to obtain an SAES encryption key; and
encrypting the SAES plaintext by using the SAES encryption key according to the SAES encryption algorithm to generate the AES initial key;
wherein the performing SAES key processing for the SAES initial key comprises:
combining a number M groups of N-bit data in the SAES initial key together to an M*N-bit serial stream;
performing cyclic shift processing for the M*N-bit serial stream to generate a new M*N-bit serial stream; and
performing a key selection processing for the new M*N-bit serial stream to select a number L groups of adjacent data from the new M*N-bit serial stream, wherein the L groups of adjacent data is used as inputs of the SAES encryption key expansion.

2. The encryption method according to claim 1, wherein the information to be encrypted is biological characteristic information.

3. The encryption method according to claim 1, wherein the SAES encryption algorithm or/and the AES encryption algorithm are implemented by an application specific integrated circuit (ASIC).

4. An encryption apparatus, comprising a simplified advanced encryption standard (SAES) encryption module and an advanced encryption standard (AES) encryption module; wherein
the SAES encryption module is configured to generate an AES initial key by using an SAES encryption algorithm; and
the AES encryption module is configured to expand the AES initial key to obtain an AES encryption key, and encrypt information to be encrypted by using the AES encryption key according to an AES encryption algorithm;
wherein the SAES encryption module comprises a processing unit and an encryption unit; wherein
the processing unit is configured to configure an SAES initial key and an SAES plaintext;
the processing unit is further configured to perform SAES key processing for the SAES initial key to obtain a processing result implemented by:
combining a number M groups of N-bit data in the SAES initial key together to an M*N-bit serial stream;

performing cyclic shift processing for the M*N-bit serial stream to generate a new M*N-bit serial stream; and performing a key selection processing for the new M*N-bit serial stream to select a number L groups of adjacent data from the new M*N-bit serial stream, wherein the L groups of adjacent data is used as inputs of subsequent SAES encryption key expansion;

the processing unit is further configured to perform the key expansion for the processing result to obtain an SAES encryption key; and the encryption unit is configured to encrypt the SAES plaintext by using the SAES encryption key according to the SAES encryption algorithm, to generate the AES initial key.

5. The encryption apparatus according to claim 4, wherein the information to be encrypted is biological characteristic information.

6. The encryption apparatus according to claim 4, wherein the SAES encryption module or/and the AES encryption module are an ASIC integrated in an encryption chip.

7. An encryption apparatus, comprising a processor, wherein the processor is configured to:

generate an Advanced Encryption Standard (AES) initial key by using a Simplified Advanced Encryption Standard (SAES) encryption algorithm implemented by:

configuring an SAES initial key and an SAES plaintext;

performing SAES key processing for the SAES initial key to obtain a processing result comprising:

combining a number M groups of N-bit data in the SAES initial key together to an M*N-bit serial stream;

performing cyclic shift processing for the M*N-bit serial stream to generate a new M*N-bit serial stream; and performing a key selection processing for the new M*N-bit serial stream to select a number L groups of adjacent data from the new M*N-bit serial stream, wherein the L groups of adjacent data is used as inputs of subsequent SAES encryption key expansion;

performing the key expansion for the processing result to obtain an SAES encryption key; and encrypting the SAES plaintext by using the SAES encryption key according to the SAES encryption algorithm to generate the AES initial key;

expand the AES initial key to obtain an AES encryption key; and encrypt information to be encrypted by using the AES encryption key according to an AES encryption algorithm.

8. The encryption apparatus according to claim 7, wherein the information to be encrypted is biological characteristic information.

* * * * *